(12) United States Patent
Barge et al.

(10) Patent No.: US 6,324,751 B1
(45) Date of Patent: Dec. 4, 2001

(54) FRAME AND LOADING APPARATUS FOR GROUPS OF BATTERY PLATES

(75) Inventors: Christopher Stephen Barge, Bristol; Lawrence Ernest Gardiner, Stroud, both of (GB)

(73) Assignee: TBS Engineering Limited, Gloucestershire (GB)

( * ) Notice: Subject to any disclaimer, the term of this patent is extended or adjusted under 35 U.S.C. 154(b) by 0 days.

(21) Appl. No.: 09/180,579

(22) PCT Filed: May 1, 1997

(86) PCT No.: PCT/GB97/01176

§ 371 Date: Nov. 12, 1998

§ 102(e) Date: Nov. 12, 1998

(87) PCT Pub. No.: WO97/44846

PCT Pub. Date: Nov. 27, 1997

(30) Foreign Application Priority Data

May 17, 1996 (GB) .................................... 9610441

(51) Int. Cl.$^7$ .......................... H01M 10/12; B65H 31/06
(52) U.S. Cl. ............................... 29/730; 29/623.1
(58) Field of Search ..................... 29/731, 623.1

(56) References Cited

U.S. PATENT DOCUMENTS

| 3,444,920 | 5/1969 | McAlpine et al. . |
| 4,074,422 | 2/1978 | Borjesson et al. . |
| 4,887,350 | 12/1989 | Hopwood . |
| 5,459,922 | 10/1995 | Hopwood . |

FOREIGN PATENT DOCUMENTS

| 2 013 964 | 8/1979 | (GB) . |
| 2 251 975 | 7/1992 | (GB) . |
| WO 94/27897 | 12/1994 | (WO) . |

*Primary Examiner*—John S. Maples
(74) *Attorney, Agent, or Firm*—Young & Thomspon

(57) ABSTRACT

An apparatus for loading battery plate groups into a battery box. The apparatus includes a compression frame which includes a number of relative movable walls and stops for gripping and retaining battery groups. The wall carry guide shins for projecting into respective cells in a battery box and guide the groups into the cells as they are pushed by a pusher. The movable nature of the walls allow the groups to be loaded into frame, when it is in released position. The walls can then be drawn together compressing the groups and retaining them in a compressed state as they are loaded.

11 Claims, 5 Drawing Sheets

FRAME AND LOADING APPARATUS FOR GROUPS OF BATTERY PLATES

CROSS REFERENCE TO RELATED APPLICATION

This is the 35 USC 371 national stage of International application PCT/GB97/01176 filed on May 1, 1997, which designated the United States of America.

FIELD OF THE INVENTION

This invention relates to apparatus for loading battery plate groups into a Battery box and, in particular, but not exclusively to loading groups for recombination batteries.

BACKGROUND OF THE INVENTION

Recombination batteries (i.e. batteries in which the hydrogen and oxygen recombine to form water) tend to have separators of microporous glass fibre in which the acid electrolyte is fully absorbed. The separator material is extremely delicate and the group has to be loaded into the battery box in a compressed state (and retained in that state by the box) in order to ensure that the electrolyte is in active contact with the places.

It will readily be appreciated that there are significant difficulties in inserting the compressed group into the battery box cell when that cell is substantially the same size without damaging the separators.

There are also problems in transferring such groups from the processing jig boxes, because the walls in the jig boxes which apply the compression can mark the separators if they do not act over the full separator surface. Accordingly attempts have been made to load the groups directly from the jig box by providing guides on the ends of the jig box walls. However, these guides can only extend partially across the width of the battery cell, because space must be allowed for the transverse supports on which the group elements sit when the jig box is being loaded. The result is that the unguided portions of the groups snag on the box wall.

SUMMARY OF THE INVENTION

From one aspect the invention consists in a frame for use in loading groups of battery plates into respective cells in a box, comprising a plurality of spaced walls defining respective group receiving spaces, the walls being moveable away from and towards each other to allow groups to be inserted in the spaces and subsequently grippingly retained therein and compressed by the walls, and guide means mounted at the lower end of the walls to locate in the cells and form a continuous surface with the walls characterised in that guide means extend across the full width of the walls, cells or groups, and in that the groups may be loaded from the frame whilst still under compression.

It is particularly preferred that the frame further comprises stop means for each space insertable between a respective pair of walls into the respective space to locate the bottom edge of a group when it is placed into the space.

From another aspect the invention consists in a frame for use in loading groups of battery plates into respective cells in a box, comprising a plurality of spaced walls defining respective group receiving spaces, the walls being moveable away from and towards each other to allow groups to be inserted into the spaces and subsequently grippingly retained therein by the walls characterised in that it further comprises removable stop means for each space insertable between -a respective pair of walls into the respective space to locate the bottom edge of a group when it is placed into the space.

Conveniently, in either case, the stop means locates the group against downward movement and lateral movement relative to the mid-plane of the group. In any of these cases, the stop means should be removable from the spaces. Thus, for example, the stop means may provide orthogonal abutments and may be rotatable about an axis adjacent to the intersection of the abutments so that the stop means can be rotated into and out of the space. The stop means may also be moveable with or in relation to the walls to maintain their relative location vis-a-vis the walls.

The distance between the group bottom edge location defined by the stop means and the top of its associated walls in preferably greater than the total height of the groups. This prevents any part of the group becoming snagged on the edges of the walls during insertion from the frame.

From yet another aspect the invention consists in battery group loading apparatus including a frame as defined above and further comprising means for loading groups into respective spaces in the frame to sit on the respective stop means, means for moving the walls towards each other to grip the groups between the walls, means for removing the stop means from the spaces, means for engaging a battery box with the guide means and means for pushing the groups through the guide means into the box.

Preferably the means for moving the walls towards each other are designed to exert compressive forces on the groups, in which case this force can be maintained during the operation of the pushing means.

The pushing means may act simultaneously on all the groups and may have heads, each of which may be formed with formations to cooperate with the terminal posts or straps cast on the groups so as to achieve precise location between the head and the group.

From another aspect the invention includes apparatus for unloading a battery group from a jig box including support means for engaging the bottom of a group on a support, whilst the group is held in a jig box, means for releasing the groups within the jig box, means for raising the support to a level at which a substantial portion of a supported group would stand clear of the jig box and means for gripping the raised group. The support may include lateral abutments for preventing sideways movements of the group during raising.

From a further aspect the invention consists in apparatus for unloading groups with cast on straps from a jig box and for loading those groups into a battery box comprising the apparatus for unloading as defined above and the battery group loading apparatus as defined above.

From a still further aspect the invention consists in a method of unloading a battery group from a jig box including engaging the bottom of a group on a support, releasing the grip of the jig box on the group, raising the support and hence the group until a substantial portion of the group is clear of the jig box and gripping the raised group.

The advantage of this method and the associated apparatus defined above, is that, in contrast to existing gripping arrangements (where the groups are gripped through openings in the jig box, whilst the groups are still in the box) is that both the jig box and the gripping means may be provided with gripping surfaces which are continuous over the whole portion which engages the group. This prevents damage and marking of the outside separators.

Although the invention has been defined above, it is to be understood that it includes any inventive combination of the features set out above or in the following description.

BRIEF DESCRIPTION OF THE DRAWINGS

The invention may be performed in various ways and a specific embodiment will now be described, by way of example, with the reference to the accompanying drawings, in which.

DETAIL BRIEF DESCRIPTION OF THE INVENTION

As has been mentioned previously recombination batteries require that the battery groups of plates and separators are inserted into the cells of a battery box under compression and that compression is maintained by the walls of the battery box cells.

Figure 1:
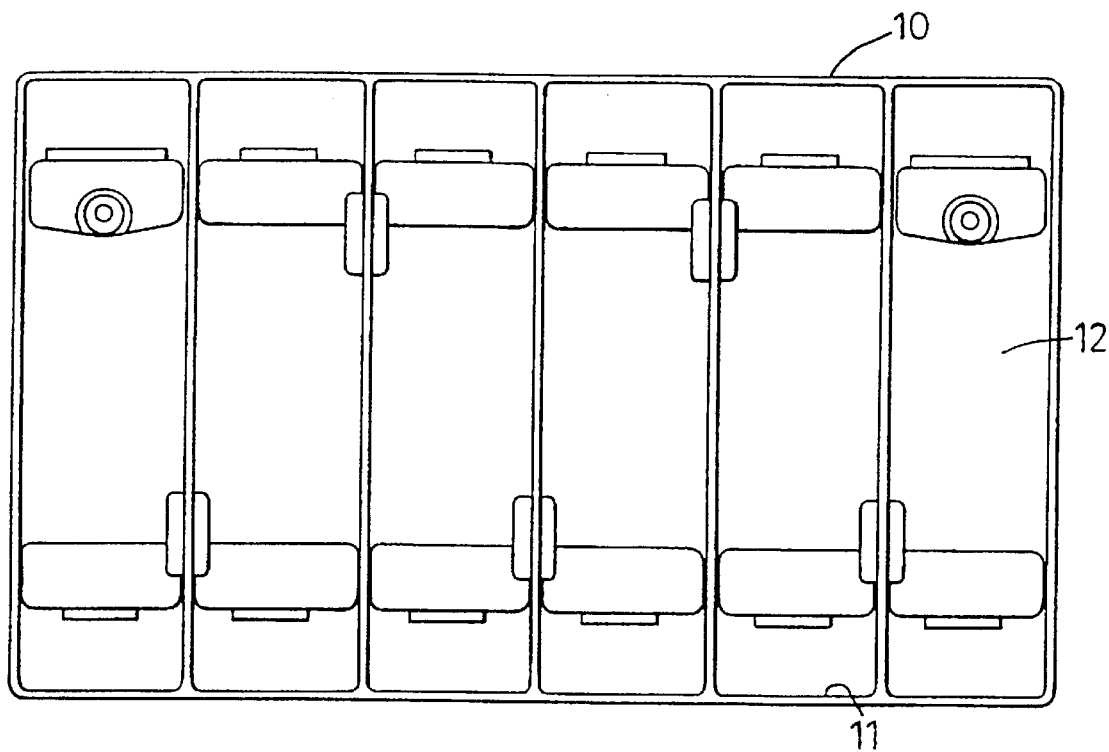
FIG. 1 is a view from above of a recombination battery with its lid removed.
Figure 2:
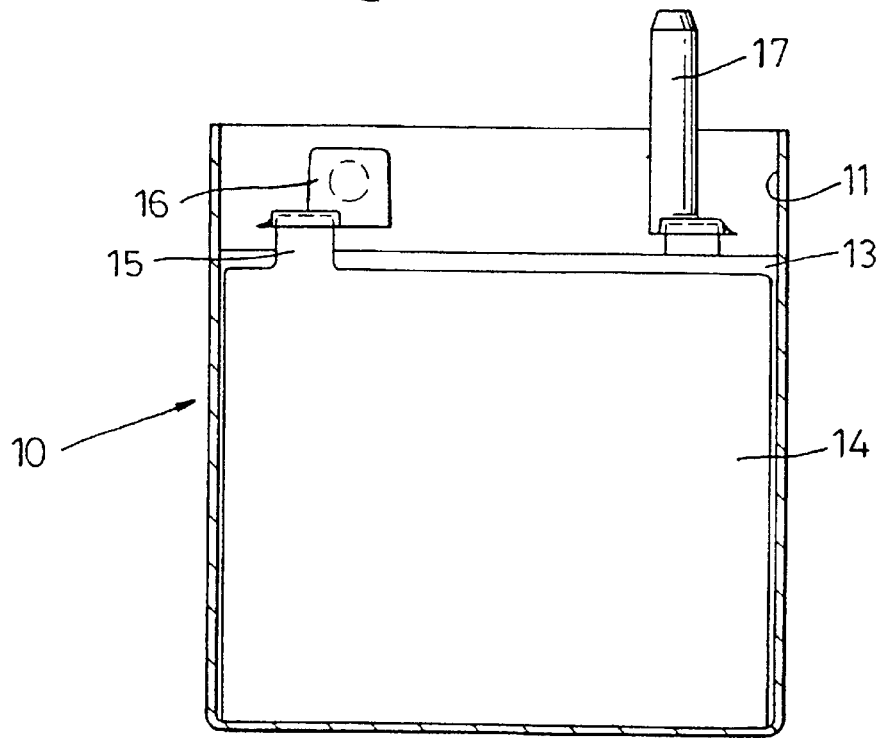
FIG. 2 is a vertical section through an end cell of FIG. 1 showing the group in situ.

FIG. 1 illustrates a battery box 10 have cells 11 in which groups 12 have been inserted. The groups 12 comprise interleaved separators 13 and plates 14. The plates 14 have lugs 15 onto which straps 16 or terminal posts 17 have been cast by a machine for casting on such straps.

Whilst such machines can take a number of forms, they now typically comprise a rotatable table which can support jig boxes in a series of circumferentially spaced locations. Each jig box comprises a number of spaces or cells into which groups can be loaded at a loading station and the jig boxes have walls which can be moved towards and away from each other to group and release the groups. As the table indexed around the groups pass through stations in which they are aligned, the lugs cleaned and fluxed, and have straps and terminal posts cast on them so that by the time a jig box arrives at an unloading station it contains, in the correct order and alignment, a set of groups 12 ready for loading into a battery box. The Applicants sell examples of such machines under the Trade Marks COS5 and COS8.

Figure 3:
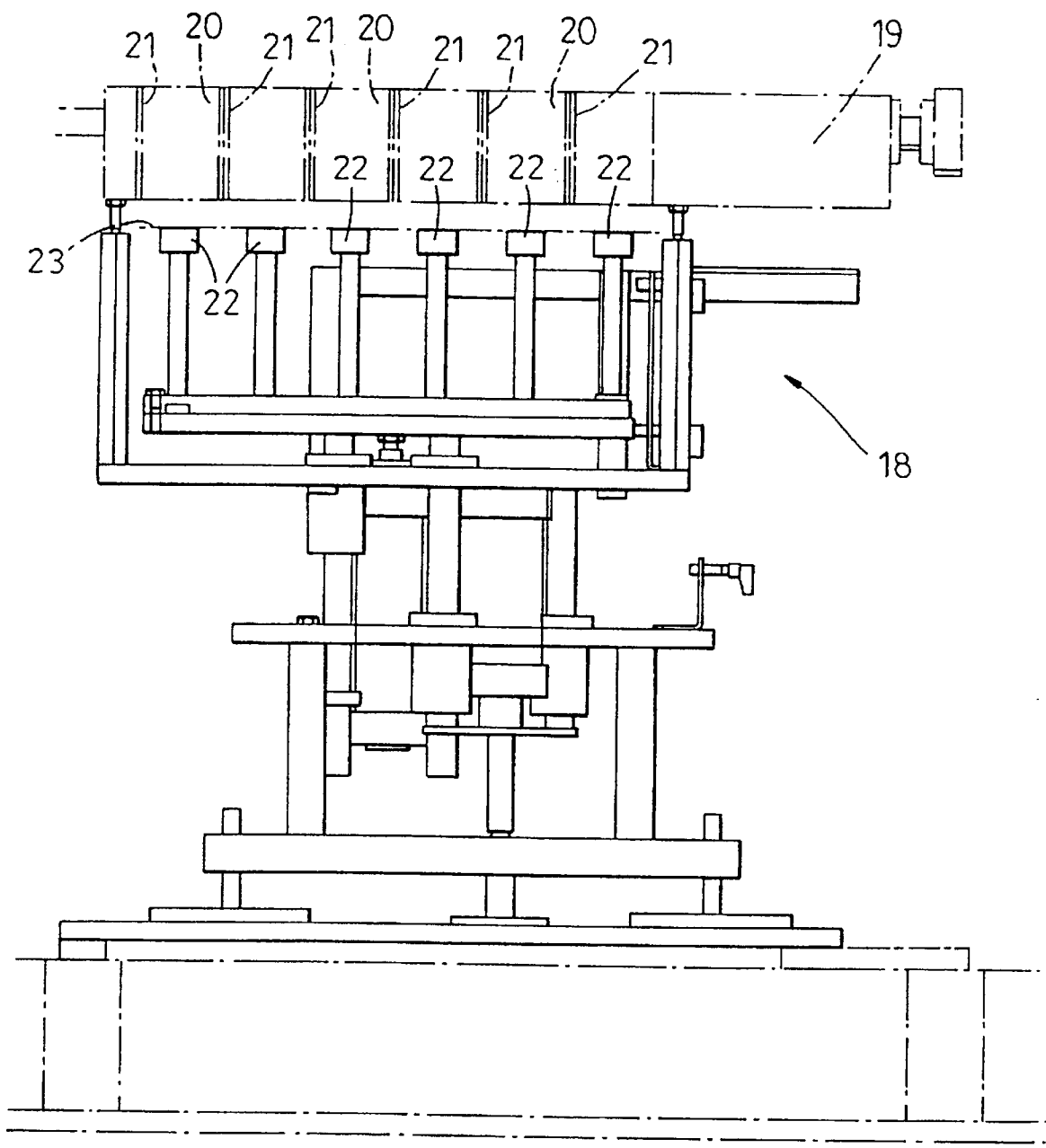
FIG. 3 is a part schematic view of an unloading station of a machine for casting straps on battery groups.

Such an unloading station is illustrated in FIG. 3 and is generally indicated 18. However the unloading station 18 has a number of new and inventive features. A jig box 19 is illustrated at the station and it can be seen that it defines a plurality of side-by-side spaces 20 in which the groups are contained. (The groups are not shown in FIG. 3). When the jig box 19 arrives at the unloading station 18 the groups 12 are gripped within the spaces 20. Contrary to traditional jig boxes designed for automatic unloading, the walls 21 of the jig box 19 are continuous and extend over almost the full area of the engaged faces on the groups 12. This means that it is not possible to remove the groups from the jig box by the traditional method of passing gripping fingers through gaps in the wall to engage the groups. The Applicant has overcome this problem by providing a series of supports 22 which are initially raised to the position shown in FIG. 3 at which they engage the lower most edge of the groups 12, as indicated by the broken line 23. (The supports 22 may have upstanding ends (not shown) to restrict lateral movement of the groups 12.)

Figures 4, 5:
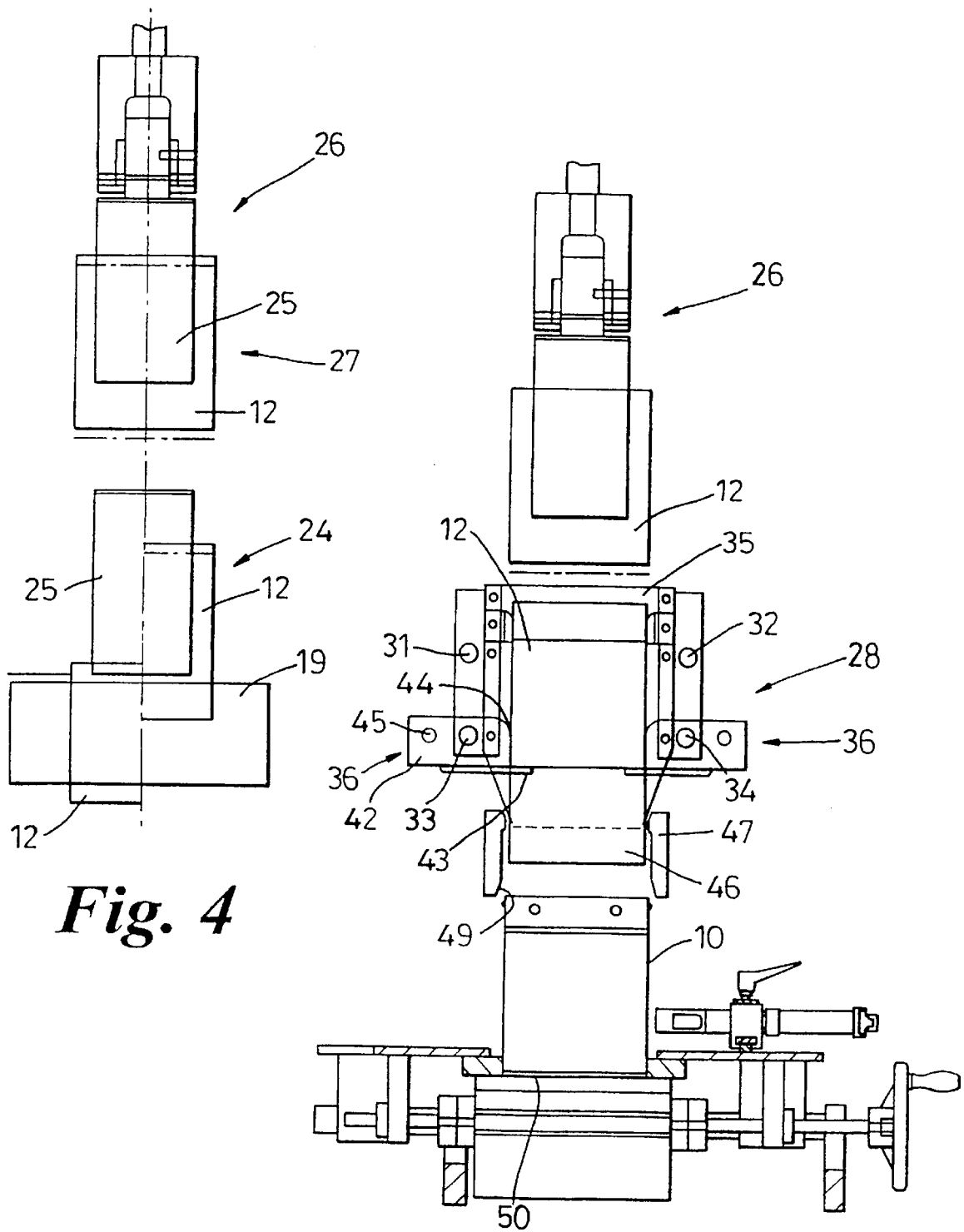
FIG. 4 is a diagrammatic representation of the removal of groups from the jig box of the machine of FIG. 3.
FIG. 5 is a diagrammatic representation of a loading configuration and illustrates in descending order a gripper holding groups, a compression frame and a battery box on a conveyor.

Once the groups 12 are engaged by the supports 22, the walls 21 can be moved marginally away from each other to release the groups, whereupon further upward movement of the supports 22 allows the groups 12 to be pushed up through the spaces 20 so that they stand substantially proud of the jig box 18 as illustrated at 24 in FIG. 4. In this position the groups 12 are engaged by plates 25 of gripper heads 26 and they can then be raised out of the jig boxes as illustrated at 27 in FIG. 4.

Figures 6, 7:
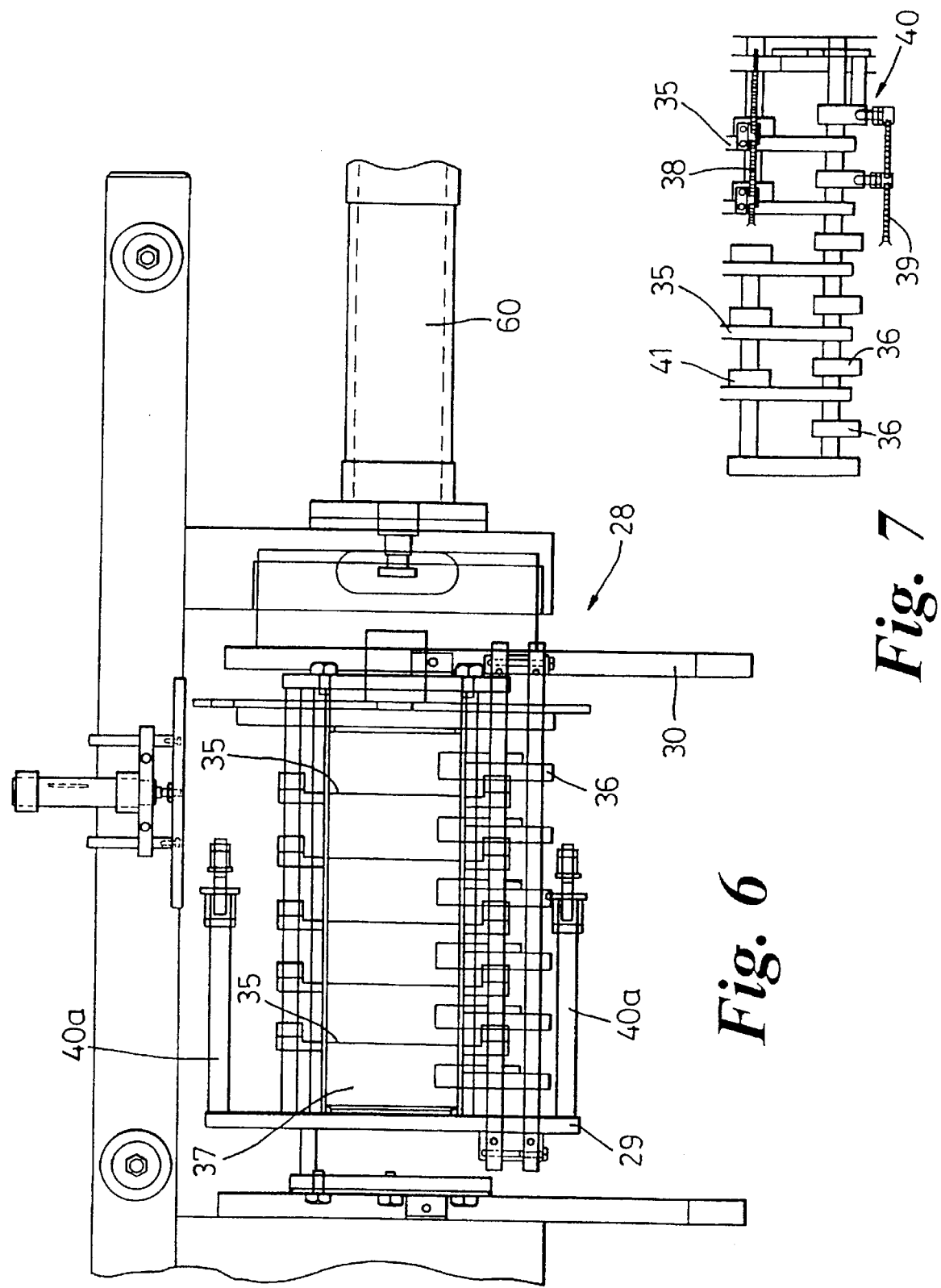
FIG. 6 is a view from above on the compression frame of FIG. 5.
FIG. 7 is a schematic partial side view of part of the frame of FIG. 6.

The removed groups 12 can then be transported laterally by the heads 26 until they overlie a compression frame, which is generally indicated at 28, as can be seen in FIG. 5. The compression frame 28 is more fully illustrated in FIGS. 6 and 7 and includes two end pieces 29, 30, which are interconnected, at each side, by pairs of vertically spaced horizontal rods 31–34. Walls 35 are slidably mounted on the upper rods 31–32, whilst stops 36 are rotatably and slidably mounted on the lower rods 33–34; there being a pair of opposed stops 36 for each group space 37 defined between a pair a of adjacent walls 35. The walls 35 and stops 36 are interlinked by respective chains 38,39 so that when an end stop and wall combination 40 is pulled away from its adjacent wall, the other walls and stops are pulled apart equally to spacing defined by the lengths of the chains. This movement is obtained by cylinder 60, which can also move in the opposite direction to compress the walls 35 together to spacings defined by spacers 41. These two positions constitute the open and closed positions of the frame 28.

As can be seen in FIG. 5 each stop 36 comprises a generally rectangular body 42, which is slidably and rotatably mounted on a respective rod 33,34, and a projecting foot 43 for supporting the bottom of a group 12. The inward ends 44 of the bodies 42 define lateral abutments for the groups 12 so that they cannot move in a sideways direction. The bodies 42 on each side are interlinked as a set by respective rods 45, which can be used to rotate the stops 36 from their support position, which is shown in FIG. 5 to a generally vertical position in which they completely disengage the groups 12.

Each wall 35 carries one or more guide shims, which are designed to project into associated cells 11 of the battery box so that they define a guide surface for the groups to be slid along as they move into the respective cells 11. The shims 46 are formed continuously with their associated walls 35 so that there are no edges or projections which can damage the groups. Preferably the walls 35 and their shims 46 are formed from a single piece of highly polished flexible metal. The height of the walls from the location defined by the feet 43 is greater than the height of the groups, so that, once inserted, the groups cannot catch on any part of the wall and the width of the walls is greater than the width of the groups.

At the lower end of the frame 28 is mounted a rectangular guide frame 47, which receives and locates the frame 28 relative to a battery box 10 carried on a conveyor 49. The guide frame 47 has a tapered open mouth 49 so that the box 10 is not damaged, when the frame 47 is engaged on it and equally the groups do not snag on the box 10 during insertion.

Returning to FIG. 5, the groups 12 held in the gripping heads 26 are loaded into respective spaces between pair of walls 35, when the walls are in their "open" position. In this position the stops are arranged as shown in FIG. 5 and so the groups are supported within their respective spaces by pairs of feet 43 and are laterally located by ends 44. The walls 35 are then drawn together by cylinder 60 until they both grip and compress the groups 12. (Adjustable stops 40a define the limit of compression and may be provided in addition to or instead of stops 41. Their advantage is that they allow easy adjustment for different battery size. Stops 41 are in any case used for 'dry' running the machine.) The frame 28 is then lowered downwardly onto a battery box 10 which has been brought to the correct position by a conveyor 50 and the exact relative position between the battery box 10 and the frame 28 is defined by the guide frame 47. At this time the stops 36 can be swung out so that the groups can then be pushed downwardly, whilst still under compression into the cells 11. Because the walls 35 and shims 46 provide a continuous surface this is achieved simply, swiftly and without damage.

Figure 8:
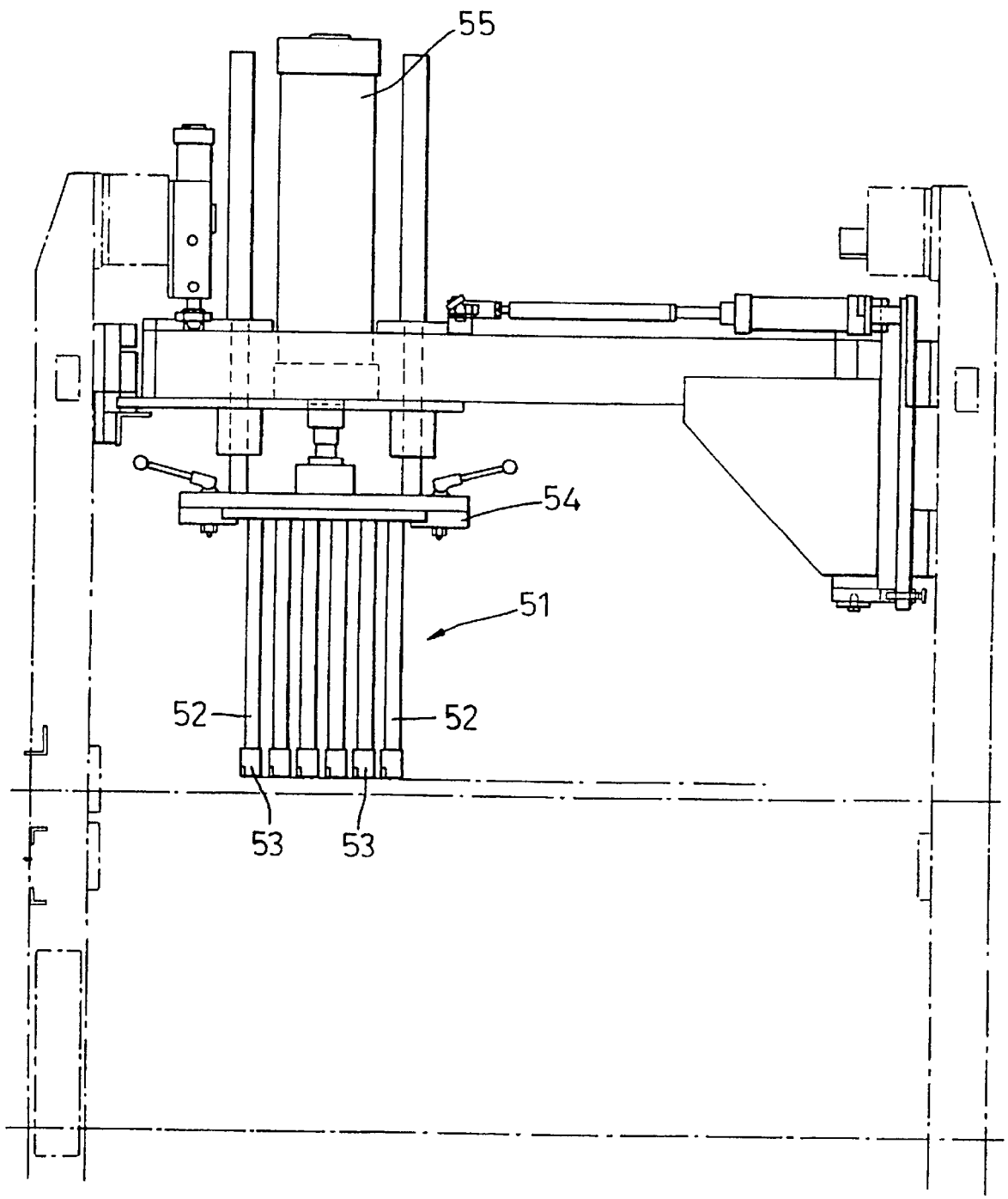
FIG. 8 is a edge view of a stuffing tool for pushing the groups from the frame of FIG. 7 into a battery box.

This pushing steps is achieved by a pusher (or stuffer) which is generally indicated at 51 in FIG. 8. The pusher comprises a number of laterally spaced vertically dependent rods 52 each of which carries a head 53 at its free end. The upper ends of the rods 52 are located on a plate 54, which can be raised and lowered by a cylinder 55. The heads 53 are profiled so that they precisely receive the upper surface of the group, the exact shape being determined by whether the engaged group includes end terminals or simply straps. This profiling not only protects the group, but ensures very precise alignment between the heads 53 and the groups 12. Once the heads 53 have been engaged on the tops of the groups 12, the cylinder 55 moves the pusher 51 downwards and the groups are pushed straight into the cells 11.

It will be understood that the whole arrangement of the frame 28 and the pusher 51 enables very precise relative location of the pusher 51, the groups 12 and the battery box 10 and so the insertion happens extremely smoothly, despite the very tight fit which is necessary in a recombination battery.

Although the invention has been described very much in the context of recombination batteries, the ability to load a series of adjacent cells simultaneously, is also attractive in the manufacture of other types of battery and the general principles outlined in the above specification may be equally applicable.

The precise construction shown in the drawings is advantageous, but the invention incorporates many variations. For example the stops could be slid in and out of the spaces, in which case a pair of stops could be constituted by a single element. Equally a single stop element might be swung up from one side.

What is claimed is:

1. A frame for use in loading groups of battery plates into respective cells in a box, comprising a plurality of spaced walls having a width and defining respective group receiving spaces, the walls being moveable away from and towards each other to allow groups to be inserted in the spaces and subsequently grippingly retained therein and compressed by the walls, and guide means mounted at a lower end of the walls to locate in the cells and form a continuous surface with the walls, wherein the guide means extend across the full width of the walls, cells or groups, and the groups may be loaded from the frame whilst still under compression.

2. A frame as claimed in claim 1 further comprising stop means for each space insertable between a respective pair of walls into the respective space to locate a bottom edge of a group when the group is placed into the space.

3. A frame for use in loading battery plates into respective cells in a box, comprising a plurality of spaced walls defining plate group receiving spaces, the walls being movable away from and towards each other to allow groups to be inserted into the spaces and subsequently grippingly retained therein by the walls; and removable stop means for each space insertable between a respective pair of walls into the respective space to locate a bottom edge of a group when the group is placed into the space.

4. A frame as claimed in claim 3 wherein the stop means locate the group against downward movement and lateral movement relative to a mid-plane of the group.

5. A frame as claimed in claim 3 wherein the stops means are removable from the spaces.

6. A frame as claimed in claim 3 wherein the stop means provide orthogonal abutments and are rotatable about an axis adjacent to an intersection of the abutments.

7. A frame as claimed in claim 3 wherein the stops means are moveable with or in relation to the walls.

8. A frame as claimed in claim 3 wherein the distance between the group bottom edge location defined by the stop means and the top of its associated walls is greater than the total height of the groups.

9. Battery group loading apparatus including a frame as claimed in claim 3 and further comprising means for loading the groups into respective spaces in the frame to sit on the respective stop means, means for moving the walls towards each other to grip the groups between the walls, means for removing the stop means from the spaces, means for engaging a battery box with the guide means and means for pushing the groups through the guide means into the box.

10. Apparatus as claimed in claim 9 wherein the means for moving the walls towards each other are further for exerting compressive forces on the groups.

11. Apparatus as claimed in claim 9 wherein the pushing means acts simultaneously on all the groups.

* * * * *